US006235458B1

(12) United States Patent
Hashimoto

(10) Patent No.: US 6,235,458 B1
(45) Date of Patent: May 22, 2001

(54) PHOTOGRAPHIC FILM AND HEAT-TREATMENT METHOD THEREOF

(75) Inventor: Kiyokazu Hashimoto, Minami Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/124,037

(22) Filed: Jul. 29, 1998

(30) Foreign Application Priority Data

Aug. 1, 1997 (JP) .................................................. 9-207992

(51) Int. Cl.[7] ............................. G03C 1/795; B32B 3/10

(52) U.S. Cl. ......................... 430/533; 430/531; 430/935; 430/939; 428/46; 428/220; 428/339; 428/910

(58) Field of Search .................................... 430/533, 935, 430/939, 523, 531; 428/220, 46, 339, 910

(56) References Cited

U.S. PATENT DOCUMENTS

| | | | | |
|---|---|---|---|---|
| 2,779,684 | | 1/1957 | Alles . | |
| 3,663,683 | | 5/1972 | Czerkas et al. . | |
| 5,631,124 | * | 5/1997 | Ikuhara et al. | 430/533 |
| 5,723,208 | * | 3/1998 | Suzuki et al. | 428/216 |
| 5,736,309 | * | 4/1998 | Kawamoto | 430/533 |

FOREIGN PATENT DOCUMENTS

| | | |
|---|---|---|
| 54-158470 | 12/1979 | (JP) . |
| 60-22616 | 2/1985 | (JP) . |
| 6464883 | 6/1989 | (JP) . |

* cited by examiner

*Primary Examiner*—Thorl Chea
(74) *Attorney, Agent, or Firm*—Birch, Stewart, Kolasch & Birch, LLP.

(57) ABSTRACT

A method for heat-treating a photographic film while conveying, which comprises the steps of: passing the photographic film through from 2 to 100 rolls disposed so that gaps between the adjacent rolls are within the range of from 0.1 cm to 50 cm; and heat-treating the photographic film during the conveyance, wherein the photographic film comprises a support having coated thereon at least one layer. Also disclosed is a method for heat-treating a photographic film, which comprises the steps of: heat-treating a photographic film; and winding the heat-treated film, wherein the heat-treated film is cooled before the winding, the cooling rate in the temperature range from the glass transition temperature (Tg) of the film +40° C. to the Tg −10° C. being at 0.01° C./second to 10° C./second. Further disclosed is a photographic film having a width direction and a lengthwise direction, and having a thickness unevenness along the film's width direction is from 2 μm to 300 μm.

12 Claims, No Drawings

PHOTOGRAPHIC FILM AND HEAT-TREATMENT METHOD THEREOF

FIELD OF THE INVENTION

The present invention relates of a photographic film and a heat-treatment method thereof.

BACKGROUND OF THE INVENTION

Hitherto, for a photographic light-sensitive material, a wet development is applied using a developer after photographing. However, in the method, there are following inconveniences and the improvement has been desired.

(1) Because a development, bleaching, fixing, and drying are carried out, a long time is required for the photographic treatment.

(2) Because plural tanks containing a developer are required, a processor cannot be small-sized and lightened.

(3) Troubles such as the replenishment of a developer, the disposal of processing liquids, washing of developing tanks, etc., are required, For the improvement thereof, photographic light-sensitive materials using a development method by heating (hereinafter, sometimes referred to as "heat development") to a temperature of from 80 to 150° C. are proposed as described in U.S. Pat. No. 3,152,904, U.S. Pat. No. 3,457,075, JP-B-43-4921 (the term "JP-B" as used herein means an "examined Japanese patent publication), JP-B-43-4924, etc. As one example, there is a method of previously incorporating a precursor for a developing agent in a light-sensitive layer, decomposing the precursor by heating to form a developing agent, and developing. In such a heat developing system, the development treatment may be carried out by only application of heat, whereby the treatment can be carried out in a short time and a processor can be small-sized. Furthermore, there are no troubles of the replenishment and the disposal of a developer.

However, in case where the light-sensitive material of this system was applied to a printing light-sensitive material, when 4 plates (blue, green, red, and black plates) were piled up, color discrepancies occurred by the dimensional change occurring during the heat development. To solve the problem, a method of heat treating under a low tension is known as described, for example, in JP-A-60-22616 (The term "JP-A" as used herein means an "unexamined Japanese patent application"), JP-A-64-64883, JP-A-54-158470, and U.S. Pat. No. 2,779,684. By conducting the low-tension heat treatment, the dimensional change between before and after the heat development could be reduced, but accompanied by the heat treatment, inferior planar property (longitudinal wrinkle fault: wrinkles occurring in the longitudinal direction (i.e., the machine direction (MD)) with a pitch of from 10 to 20 cm) occurred. This is a large problem for a photographic support which is required to have a high planar property and as the counterplan thereof, a method of passing a light-sensitive material between rolls is known as described in U.S. Pat. No. 3,663,683. However, in the method, stains occurred on the surface of the photographic support, which was also a large problem. Furthermore, in the cooling process after the heat treatment, an inferior planar property (streaking trouble: galvanized iron sheet-like fine streaks occurring in the longitudinal direction (i.e., the machine direction (MD)) at a pitch of from 1 to 3 cm) occurred.

SUMMARY OF THE INVENTION

An object of the present invention is to provide a photographic film having less surface stains after heat treatment and a good planar property, and also to provide a heat treatment method thereof.

Other objects and effects of the present invention will become apparent from the following description.

The above-described objectives have been achieved by providing the following constitutions.

(1) A method for heat-treating a photographic film while conveying, which comprises the steps of:

passing said photographic film through from 2 to 100 rolls disposed so that gaps between the adjacent rolls are within the range of from 0.1 cm to 50 cm; and heat-treating said photographic film during the conveyance, wherein said photographic film comprises a support having coated thereon at least one layer.

(2) The heat-treatment method according to the above (1), wherein the total thickness of the layer(s) coated on said support is from 0.1 $\mu$m to 20 $\mu$m.

(3) The heat-treatment method according to the above (1) or (2), wherein the layer(s) coated on said support are formed from aqueous solution(s).

(4) The heat-treatment method according to any one of the above (1) to (3), wherein said film is conveyed at a tension of from 1 $kg/cm^2$ to 10 $kg/cm^2$.

(5) The heat-treatment method according to any one of the above (1) to (4), wherein said heat-treatment is carried out at from 100° C. to 220° C. for from 0.1 second to 30 minutes.

(6) The heat-treatment method according to any one of the above (1) to (5), wherein said film comprises a polyester.

(7) A method for heat-treating a photographic film, which comprises the steps of:

heat-treating a photographic film; and winding said heat-treated film, wherein said heat-treated film is cooled before said winding, the cooling rate in the temperature range from the glass transition temperature (Tg) of said film +40° C. to the Tg −10° C. being at 0.01° C./second to 10° C./second.

(8) The heat-treatment method according to any one of the above (1) to (6), which further comprises winding said heat-treated film, wherein said heat-treated film is cooled before said winding, the cooling rate in the temperature range from the glass transition temperature (Tg) of said film +40° C. to the Tg −10° C. being at 0.01° C./second to 10° C./second.

(9) A photographic film having a width direction and a lengthwise direction, and having a thickness unevenness along said film's width direction is from 2 $\mu$m to 300 $\mu$m.

(10) The photographic film of the above (9), wherein the film is prepared by a heat-treatment method according to any one the above (1) to (8).

DETAILED DESCRIPTION OF THE INVENTION

In the present invention, the absolute value of heat dimension changing ratio of a support caused by heat treatment at 120° C. for 30 seconds is preferably from 0.001% to 0.04%, more preferably from 0.002% to 0.03%, and further preferably from 0.003% to 0.02%. This requirement regarding the heat dimension changing ratio is preferably satisfied in both the lengthwise direction (i.e., machine direction (MD)) and width direction (i.e., transverse direction (TD)).

The present inventors unexpectedly found that the tension at the heat treatment of a support and preferably also at coating a subbing layer and a back layer becomes an important factor for the heat dimensional changing ratio.

In the case of coating a subbing layer and a back layer, the coated layers are sometimes dried at a high temperature of from 100 to 200° C. and in this step, the support is stretched by a tension and becomes again to have a large residual stress. In this specification, the term "after subbing" means the whole step after forming at least a subbing layer on one surface and a back layer on the other surface of a support.

The tension at the heat treatment, and preferably also at coating a subbing layer and a back layer is from 0.04 $kg/cm^2$ to 8 $kg/cm^2$, preferably from 0.2 $kg/cm^2$ to 6 $kg/cm^2$, and more preferably from 1 $kg/cm^2$ to 5 $kg/cm^2$.

In addition, the tension in the present invention is shown by the value obtained by dividing the force applied to a support by the cross section area (width x thickness) of the support.

The control of such a tension can be easily attained by controlling the torque of a winding motor and/or a delivery motor. Also, the control of the tension can be easily attained by disposing a dancer roller device and controlling a load applied thereto. Furthermore, to control a low tension, a method of previously measuring the heat shrinking amount of the support and reducing the winding amount corresponding to the amount is also preferred.

By the above-described method, the tension generated by a heat shrinking stress is also controlled and the treatment at a more weak tension becomes possible. Also, it is preferred that the width direction is not regulated by clips, etc., but a support is caused to freely shrink. To transport a support at such a low tension, it is preferred to use, if possible, an air-floating transport besides a roll transport. This is because the occurrence of scratches caused with the lowered roll holding force is prevented.

The heat-treatment temperature or the drying temperature is from 70° C. to 220° C., preferably from 80° C. to 200° C., and more preferably from 90° C. to 190° C.

The control of the above-described drying temperature may be carried out by using a panel-form heater incorporated with a nichrome heater, etc., may be carried out by using a heat source such as a halogen lamp, an IR heater, etc., or may be carried out by feeding a hot air, Temperature sensors are disposed in a drying zone to monitor the temperature at each portion, whereby the temperature is controlled by controlling the output of these heat sources. For the purpose, it is preferred for restraining the ununiformity of temperature that these heat sources divided to have a structure capable of being controlled individually. Also, it is preferred for removing temperature unevenness to enclose the casing for carrying out the drying treatment with a heat-insulating material such as glass wools, etc.

In general, after the above-described step, the subsequent heat treatment, that is, (1) a heat treatment while conveying and/or a heat treatment at the state wound into a roll form is carried out. The above-described heat treatment may be practiced in succession to the first step, but it is more preferred to carry out the heat treatment after once winding the support.

This is because there is an unexpected synergistic effect that the heat dimension changing ratio is more reduced although the mechanism thereof has not yet been clarified. Furthermore, for continuously practicing these steps, a very long and large drying heat-treatment zone is required to increase the equipment cost.

In succession to the heat treatment, a post heat treatment may be carried out. The post heat treatment is carried out, in succession to the above-described heat treatment, at a temperature of from 15° C. to 70° C., preferably from 20° C. to 60° C., and more preferably from 25° C. to 50° C.

The heat-treatment time is preferably from 1 second to 5 minutes, more preferably from 5 seconds to 3 minutes, and further preferably from 10 seconds to 1 minute.

The post heat treatment is preferably carried out while transporting in succession to the heat treatment of the present invention, and the tension in this step is preferably from 0.04 $kg/cm^2$ to 6 $kg/cm^2$, more preferably from 0.2 $kg/cm^2$ to 5.5 $kg/cm^2$, and far more preferably from 1 $kg/cm^2$ to 5 $kg/cm^2$.

The above-described longitudinal wrinkle fault is based on a kind of a necking phenomenon occurring by being stretched between rolls during a heat treatment process. That is, by a heat treatment at a high temperature as the heat treatment of the present invention, the modulus of elasticity of a film is greatly lowered and the film is stretched even by a slight conveying tension. In this case, due to ununiformity (uneven thickness, uneven stretching, etc.) present in the inside of the film, portions willing to be stretched and portions unwilling to be stretched occur, which cause uneven stretching. The portions stretched greater are loosen to form wrinkles. This is the longitudinal wrinkle trouble.

An effective counterplan for such wrinkles is a method of disposing rolls densely (hereinafter referred to dense rolls) and passing a heated film between the rolls alternately (i.e., in zig-zag way so as to allow the film to contact the upper surface of the first roll, the lower surface of the second roll, the upper surface of the third roll, . . . ). By this method, the support is pressed to the roll surfaces, whereby the wrinkles are smoothed and a good plane is obtained. To carry out the method, the dense rolls may be disposed in a low-tension heat treatment zone or the method may be practiced after the low-tension heat treatment zone.

The temperature of the film in this processing is generally from 100° C. to 220° C., preferably from 110° C. to 200° C., and more preferably from 120° C. to 170° C. The treatment time is from 0.1 second to 20 minutes, more preferably from 0.5 second to 10 minutes, and further preferably from 1 second to 3 minutes. If the temperature and the time are less than the ranges, the wrinkles cannot sufficiently been smoothed and if the temperature and the time exceed the ranges, the film is undesirable colored. Such heating of the film may be practiced by the heat conducted from the heat treatment zone or the dense rolls may be used as heating rolls to supply heat therefrom.

The conveying tension applied to the film is preferably from 0.1 $kg/cm^2$ to 10 $kg/cm^2$, more preferably from 0.3 $kg/cm^2$ to 6 $kg/cm^2$, and further preferably from 0.5 $kg/cm^2$ to 4 $kg/cm^2$. In this case, the term "tension" means a value of the conveying force divided by the cross section area of the film. If the tension is less than the range, the film cannot be sufficiently pressed by the rolls, which is undesirable, and if the tension exceeds the range, the heat shrinkage by the heat development becomes undesirable large.

The interval between the rolls in the disposition of the dense rolls is preferably from 0.1 cm to 50 cm, more preferably from 0.3 cm to 30 cm, and far more preferably from 0.5 cm to 15 cm. In this case, the interval between rolls means the shortest distance (gap) between the adjacent rolls. If the interval is less than the range of the present invention, handling such as paper passing, etc., is hard to perform and, if the interval exceeds the range, necking occurs again between the rolls and longitudinal wrinkles are liable to undesirable form. In addition, to make sure, the interval between the rolls in the present invention does not means the gap between a pair of opposite rolls for use in rolling processing by passing a material therethrough.

The number of the rolls disposed with such an interval is preferably from 2 to 100, more preferably from 2 to 50, and further preferably from 2 to 20. If the number of the rolls exceeds the range, scratches are liable to cause at the surface of a film as well as a large equipment is required, which are undesirable.

There is no particular restriction on the material of the rolls, and aluminum, iron, stainless steel, ceramics, etc., can be used. Furthermore, it is preferred to coat the surface of the material with an inorganic material such as nickel, chromium, ceramics, etc., or with a heat resisting organic material such as a silicone rubber, teflon, etc. To practice conveying of a film at a low tension, it is preferred that these rolls are as light as possible and hollow rolls are also preferably used. Also, the rolls having a surface roughness of from 0.001 $\mu$m to 0.1 $\mu$m are preferably used. Rolls having a rough surface are not preferred because the unevenness transfers to the support softened by a high temperature.

The diameter of these rolls is preferably from 1 cm to 50 cm, more preferably from 2 cm to 40 cm, and far more preferably from 3 cm to 30 cm. If the diameter is less than the range, the wrinkles cannot be sufficiently smoothed, which is undesirable. Also, the diameter exceeds the range, a large equipment is required, which is also undesirable.

However, by passing through such dense rolls, the problem of wrinkles is solved, but a new problem that the surface of the film is stained may occur. This is because oligomers (low polymerization degree components in the support) existing in the inside of the film are liable to deposit on the surface of the film. This is assumed to be caused by the following reason. That is, when a film is bent, the outer side thereof is stretched and the inner side thereof is compressed. When the film is alternately passed through the dense rolls, the curvature of the film is inverted from + to − and a large stress acts to the thickness direction in the inside of the support. Thus, the oligomer components existing in the inside of the film diffuse to the surface, whereby the surface is liable to be stained.

Accordingly, in the present invention, it is the feature that after forming coated layer on the surface of the support, the film is passed through the dense rolls to apply a heat treatment. There is no particular restriction on the coated layer if the composition of the coated layer differs from the composition of the support. This is because the diffusion of the oligomers in the support having the same composition is fast, but the diffusion thereof in the coated layer having a different composition is slow. The more preferred coated layer is a layer formed by coating an aqueous or water-dispersing coating liquid. This is because these coated layers generally have a polar group and are hydrophilic, and generally have a different property from that of the support having generally a small polarity, whereby the oligomers are prevented from being diffused and the surface of the film is reliable to be stained.

Examples of a preferred material of the coating layer include saccharose derivatives such as gelatin, gelatin derivatives, casein, agar, sodium alginate, starch, polyvinyl alcohol, a polyacrylic acid copolymer, gum arabic, starch derivatives, etc.; a copolymer of maleic anhydride with a cellulose compound such as carboxymethyl cellulose, hydroxymethyl cellulose, etc.; and water-soluble polymers such as a water-soluble polyester (obtained by copolymerizing a sulfonic acid base, polyethylene glycol, etc.), etc.

Also, cellulose esters such as carboxymethyl cellulose, hydroxyethyl cellulose, etc.; a vinyl polymer or copolymer (copolymerized using a monomer selected from vinyl chloride, vinylidene chloride, butadiene, vinyl acetate, styrene, acrylonitrile, a methacrylic acid ester, methacrylic acid, acrylic acid, itaconic acid, maleic anhydride, an acrylic acid ester, etc., as a starting material); water dispersion latex polymers such as polyurethane, polyolefin, and the modified products thereof, etc., can be used. The average particle size of the polymer latex is preferably from 20 nm to 200 nm.

Furthermore, examples of the coating material include solutions of cellulose series polymers such as diacetyl cellulose, nitrocellulose, triacetyl cellulose, hydroxypropyl cellulose, etc.; (meth)acrylic acid ester polymers such as polymethyl methacrylate, ethyl acrylate, etc.; olefin series polymers such as polyethylene, etc.; styrene series polymers; vinylidene chloride; rubber series polymers such as urethane series polymers, butadiene, etc.; polyurethane; poly-carbonate; polyarylate; gelatin, etc., dissolved in organic solvents.

In these materials, particularly preferred coated layers are the layer formed by coating an aqueous solution of gelatin or a gelatin derivative, and the layer formed by coating a water-dispersed latex of a vinyl series polymer or copolymer (in particular, those prepared by using a monomer selected from vinyl chloride, vinylidene chloride, butadiene, vinyl acetate, styrene, acrylonitrile, a methacrylic acid ester, methacrylic acid, acrylic acid, itaconic acid, maleic anhydride, and an acrylic acid ester as a starting material).

It is preferred that the coated layer described above is formed on at least one surface, preferably on both surfaces of the film. The number of the layer is preferably from 1 to 20, more preferably from 2 to 10, and further preferably from 2 to 6. These layers may be formed by simultaneous coating or successive coating.

The dry thickness of the total coated layers is preferably from 0.1 $\mu$m to 20 $\mu$m, more preferably from 0.3 $\mu$m to 15 $\mu$m, and further preferably from 0.8 $\mu$m to 10 $\mu$m.

Into the coated layer may be added an antistatic agent, an antihalation agent, a crossover cutting agent, a dyeing agent, a ultraviolet cutting agent, a matting agent, a scratch resisting protective agent, a crosslinking agent, a plasticizer, etc.

It preferred to add a matting agent so as to impart a slipping property. Thereby, slipping of the dense rolls and the film is improved and the occurrence of scratches can be prevented. Examples of the preferred matting agent include inorganic fine particles of silica, alumina, calcium carbonate, zirconia, titania, etc., and organic fine particles of polymethyl methacrylate, polystyrene, gelatin, polymethacrylate and the crosslinked products of them. The size of these fine particles is from 0.1 $\mu$m to 20 $\mu$m, preferably from 0.2 to 10 $\mu$m, and far more preferably from 0.3 $\mu$m to 5 $\mu$m. The preferred coating amount of the matting agent is preferably from 0.5 mg/m$^2$ to 10 mg/m$^2$ and more preferably from 1 mg/m$^2$ to 5 mg/m$^2$.

Similarly, to impart a slipping property, it is also preferred to add a silicone oil, a paraffin series compound, a surface active agent, etc.

It is also preferred to add a crosslinking agent so as to improve the strength of the coated layer. For example, examples of the crosslinking agent include those of triazine series, epoxy series, melamine series, isocyanate series containing a block isocyanate, azilidine series, oxazaline series, etc.

Furthermore, it is preferred to add the fine particles of an electrically conductive crystalline metal oxide or the composite oxide thereof to the back layer so as to lower the surface resistivity below $10^{12}$ $\Omega$. Thereby, the adsorption of dusts to the surface due to static electricity is prevented, and the formation of scratches by being pressed with dusts, which are particularly liable to form in the use of dense rolls, can be reduced.

The fine particles of the electrically conductive crystalline metal oxide and the composite oxide thereof preferably have a volume resistivity of $10^7$ Ωcm or lower, and more preferably $10^5$ Ωcm or lower. Also, the particle sizes are preferably from 0.01 to 0.7 μm, and particularly preferably from 0.02 to 0.5 μm.

The production methods of the fine particles of the electrically conductive crystalline metal oxide or the composite oxide thereof are described in detail in JP-A-56-143430.

That is, first, a method of preparing fine particles of a metal oxide by a calcination and heat-treating the fine particles in the existence of a different kind of atom for improving the electric conductivity; secondary, a method of producing the fine particles of a metal oxide by a calcination in the co-existence of a different kind of atom for improving the electric conductivity; thirdly, a method of introducing an oxygen defect by lowering the oxygen concentration in the atmosphere in the case of producing the fine particles of a metal oxide by a calcination, etc., are easy to be utilized.

With regard to examples containing a metal atom, examples of the metal atom include Al, In, etc., for ZnO, Nb, Ta, etc., for $TiO_2$, and Sb, Nb, a halogen atom, etc., for $SnO_2$. In these examples, the fine particles of an $SnO_2$ composite metal oxide containing Sb added thereto are preferred.

Also, a dyed light-insensitive hydrophilic colloid layer (hereinafter, is referred to as dyed layer) may be formed for the purposes of a halation prevention, the improvement of safelight safety, the improvement of the distinguishing property of the front and back sides. The above technique is described in detail in the patents described below. That is, there are a method of adsorbing a dye to a mordant as described in U.S. Pat. Nos. 3,455,693, 2,548,564, 4,124,386, and 3,625,694, JP-A-47-13935, JP-A-55-33172, JP-A-56-36414, JP-A-57-761853, JP-A-52-29727, JP-A-61-198148, JP-A-61-177447, JP-A-61-217039, JP-A-61-219039, etc., and a method of using a water-insoluble solid dye described in JP-A-61-213839, JP-A-63-208846, JP-A-63-296039, JP-A-56-12639, JP-A-55-155350, JP-A-55-155351, JP-A-63-27838, and JP-A-63-197943, EP Nos. 15,601, 274,723, 276,566, and 299,455, WO 88/04794 and JP-A-2-264936. In these methods, the method of dispersing a dye as solid thereof is preferred because in this case, the residual color after a development treatment is less.

The coating material can be coated by a generally well-known coating method such as, for example, a dip coating method, an air knife coating method, a curtain coating method, a roller coating method, a wire bar coating method, a gravure coating method, or an extrusion coating method using the hopper described in U.S. Pat. No. 2,681,294 can be used. Also, if necessary, two or more layers can be simultaneously coated by the methods described in U.S. Pat. Nos. 2,761,791, 3,508,947, 2,941,898, and 3,526,528, and Yuuji Harasaki (Coating Koogaku (Engineering)), page 253 (published by Asakura Shoten, 1973).

Surface treatment is preferably carried out prior to the coating for improving the adhesive property. Examples of a preferred surface treatment include a glow discharging treatment, a corona treatment, a ultraviolet irradiation treatment, and a flame treatment.

In the glow treatment, in the case of, in particular, introducing steam in the atmosphere, the most excellent adhesive effect can be obtained.

The steam partial pressure is preferably from 10% to 100%, and more preferably from 40% to 90%. As a gas other than steam, there is air made up of oxygen, nitrogen, etc.

The pre-heating temperature is preferably from 50° C. to Tg, more preferably from 60° C. to Tg, and further preferably from 70° C. to Tg.

The vacuum at glow discharging is preferably from 0.005 to 20 Torr, and more preferably from 0.02 to 2 Torr. Also, the voltage is preferably from 500 to 5,000 V, and more preferably from 500 to 3,000 V.

The discharging frequency is from a direct current to several thousands MHz, preferably from 50 Hz to 20 MHz, and more preferably from 1 kHz to 1 MHz. The discharging treatment intensity is preferably from 0.01 kV•A•minute/$m^2$ to 5 kV•A•minute/$m^2$, and more preferably from 0.15 kV•A•minute/$m^2$ to 1 kV•A•minute/$m^2$, whereby a desired adhesive performance is obtained.

It is suitable that the discharging frequency of the corona treatment is from 50 Hz to 5,000 kHz, and preferably from 5 kHz to several hundreds kHz. It is also suitable that the treating intensity to a material to be treated is from 0.001 kV•A•minute/$m^2$ to 5 kV•A•minute/$m^2$, and preferably from 0.01 kV•A•minute/$m^2$ to 1 kV•A•minute/$m^2$. Furthermore, it is suitable that the gap clearance of the electrode and the dielectric roll is from 0.5 to 2.5 mm, and preferably from 1.0 to 2.0 mm.

It is preferred that the ultraviolet treatment is carried out by the treatment method described in JP-B-43-2603, JP-B-43-2604, and JP-B-45-3828. A mercury lamp is a high-pressure mercury lamp or a low-pressure mercury lamp each composed of a quartz tube and having ultraviolet ray wavelengths of from 180 to 380 nm is preferred.

Regarding the method of the ultraviolet irradiation, when a high-pressure mercury lamp wherein the main wavelength is 365 nm is used, the irradiating light quantity is preferably from 20 to 10,000 (mJ/$cm^2$) and more preferably from 50 to 2,000 (mJ/$cm^2$). When a low-pressure mercury lamp wherein the main wavelength is 254 nm is used, the irradiating light quantity is preferably from 100 to 10,000 (mJ/$cm^2$), and more preferably from 200 to 1500 (mJ/$cm^2$).

In the method of the flame treatment, a natural gas or a liquefied propane gas may be used, but the mixing ratio with air is important. In the case of the propane gas, a preferred mixing ratio of a propane gas/air is from 1/14 to 1/22, and preferably from 1/16 to 1/19 by volume ratio. Also, in the case of the natural gas, the mixing ratio is preferably from 1/6 to 1/10, and preferably from 1/7 to 1/9.

It is suitable that the flame treatment is carried out in the range of from 1 to 50 kcal/$m^2$, and preferably from 3 to 30 kcal/$cm^2$. Also, it is more effective that the distance between the tip of the inside flame of a burner and a support is shorter than 4 cm. As the treatment apparatus, a flame treatment apparatus manufactured by Kasuga Denki K. K. can be used. Also, as for a back up roll for supporting a support upon the flame treatment, a hollow roll is preferably used while being cooled by passing therethrough cooling water to keep the processing temperature constant.

There is no particular restriction on the support for use in the present invention, but preferred examples thereof include polyester series supports (polyethylene terephthalate, polyethylene naphthalate, and the copolymers thereof), polycarbonate, polystyrene (syndiotactic, atactic, and isotactic), polyarylate each being excellent in thermal resistance, mechanical strength and transparency. Of these polymers, polyethylene terephthalate (PET), polyethylene naphthalate (PEN), and syndiotactic polystyrene (SPS) are more preferred, and polyethylene terephthalate is particularly preferred.

Furthermore, in the present invention, by cooling the film, after the heat treatment and before winding, at a rate of from 0.01° C./second to 10° C./second, preferably from 0.1° C./second to 8° C., and more preferably from 0.3° C./second to 6° C./second in the temperature range between a glass transition temperature (Tg) of the film +40° C. and the Tg −10° C., the occurrence of the streaking trouble (galvanized iron sheet-like fine streaks occurring in the longitudinal direction at a pitch of from 1 to 3 cm) occurred at cooling can be prevented. It has been clarified that the reason thereof is as follows. That is, if the support is suddenly cooled at the outlet of the heat treatment zone, the support drastically shrinks in the width direction when the temperature of the support becomes below the Tg thereof. That is, the film width at temperatures above the Tg is larger than the film width at temperatures below the Tg. Therefore, if the film width is attempted to be kept constant, waving occurs in the width direction at temperatures above the Tg. The thus occurred waving leads to a striking trouble with a fine pitch when the film is cooled and solidified. It is the point of the present invention to control the rate of the temperature change in the temperature rage including Tg as described above. The cooling rate is lower than that of the present invention, the productivity is reduced and when the cooling rate exceeds that of this invention, the streaking trouble is liable to occur, which are undesirable.

Such a temperature control can be easily attained by the methods shown below.

(1) Disposing one or plural heat treatment zones having a treating temperature near Tg at the outlet of the heat treatment zone, and lowering the treating temperature gradually or setting the temperatures of plural zones so as to gradually lower the film temperature.

(2) Disposing a blow-off nozzle of warm wind the temperature of which is gradually lowered, and applying the wind to the film, to thereby gradually lower the film temperature.

(3) Passing the support through plural heating rolls the temperatures of which are successively lowered, to thereby gradually lower the film temperature.

It is preferred that even in such a cooling zone, the support is conveyed at the low tension as described above.

By using at least one of (A) the low-tension heat treatment by the dense rolls and (B) the control of the cooling rate at the outlet of the heat treatment zone, a support having a very high planar property can be obtained. That is, a very smooth plane without having the occurrence of longitudinal streaks and streaking can be attained.

That is, when these troubles exist, thickness unevenness occurs along the width direction (transverse direction (TD)) of the film. By practicing the present invention, the thickness unevenness along the film's width direction becomes generally from 2 $\mu$m to 300 $\mu$m, preferably from 5 $\mu$m to 200 $\mu$m, and more preferably from 10 $\mu$m to 150 $\mu$m. Thickness unevenness of a film can be easily measured by floating the support (film) on the surface of water and scanning the surface of the support by a laser focus displacement meter.

The measurement methods used in the present invention are described below.

(1) Tension

A differential trans-type tension test machine (for example, LX-TC-100, manufactured by Mitsubishi Electric Corporation) is disposed to the roll at just before the heat treatment zone and at just after the heat treatment zone, the tensions at 25° C. are measured and the mean value thereof are obtained.

(2) Unevenness Along the Width Direction of Film

A film is cut to the size of 50 cm in width direction (TD) and 30 cm in the lengthwise direction (MD), and it is floated on the surface of water such that bubbles do not enter therebetween.

The surface thereof is scanned by a laser focus displacement meter (for example, Type LC2210, manufactured by Keyence Co.) along the width direction at 50 cm/minute. The highest value—the lowest value (excluding both ends of the film) obtained is defined as the thickness unevenness along the width direction of the film.

(3) Thermal Dimensional Changing Ratio (i) Sampling:

At the three points of the center and both the ends of a sample film, each three samples along the lengthwise direction (MD) and each three samples along the width direction (TD) are sampled. Each sample is a rectangle of 5 cm×25 cm, when the dimensional change along the MD direction is measured, the sample piece of 25 cm is sampled in parallel with the MD direction, and when the dimensional direction in the TD direction is measured, the sample piece of 25 cm is sampled in parallel with the TD direction.

(ii) Measurement of Dimensional Changing Ratio

At the center portion of each sample described above, two holes with an interval of 20 cm are formed. After humidifying each sample at 25° C. and 60% RH for 12 hours, the interval of the 2 holes are measured using a pin gauge (the length is defined as L1). Thereafter, each sample is pressed onto a flat stainless steel plate heated to 120° C. and having a thickness of 10 mm for 30 seconds. Thereafter, the sample is humidified at 25° C. and 60% RH for 12 hours and then the interval is measured again using a pin gauge (the length is defined as L2). The thermal dimensional changing ratio is obtained based on the following formula.

Thermal dimensional changing ratio (%)=the absolute value of $\{100\times(L1-L2)/L1\}$.

The absolute values at the 3 points of the center and both the ends of each sample are averaged for each of MD and TD.

(4) Glass Transition Temperature (Tg)

1) A sample of 10 mg is set in an aluminum-made pan in a nitrogen gas stream.

2) The Tg is measured using a scanning-type differential calorimeter (DSC) in a nitrogen gas stream in the following means.

(a) The temperature is raised to 300° C. at a rate of 20° C./minute (1st run).

(b) Cooled to room temperature to form a noncrystalline state.

(c) The temperature is raised again at a rate of 20° C./minute (2nd run).

The glass transition temperature is obtained as the arithmetic mean of the temperature at which the sample begins to deviate from the base line in the 2nd run and the temperature at which the sample returns to a new base line.

The present invention will be described in detail with reference to the following Examples, but the invention should not be construed as being limited thereto.

EXAMPLE 1

(1) Preparation of Support (1-1) Preparation of Polyethylene Terephthalate (PET):

Using terephthalic acid and ethylene glycol, PET of IV=0.66 (measured in phenol/tetrachloroethane=6/4 (weight ratio) at 25° C.) was obtained according to an ordinary method. After forming pellets from the PET and drying at 130° C. for 4 hours, the pellets were extruded from a T-type die after melting at 300° C. followed by quenching to provide an unstretched film of a thickness which became 100 $\mu$m after thermal fixing.

The film was longitudinally stretched to 3.3 times using rolls each having a different peripheral speed, then width direction stretching to 4.5 times was practiced by a tenter, and the temperatures in this case were 110° C. and 130° C. respectively. Thereafter, after thermally fixing at 240° C. for 20 seconds, the sample film was mitigated by 4% to the width direction at the same temperature. Thereafter, after slitting the chuck portion of the tenter, knurl working was applied to both ends and the film was wound at 4 kg/cm$^2$. Thus, the rolled film having a width of 1.5 meters and a film thickness of 100 $\mu$m was obtained. The Tg of the PET thus obtained was 72° C.

(1-2) Preparation of Polyethylene Naphthalate (PEN) Support:

Using 2,6-naphthalenedicarboxylic acid dimethyl ester and ethylene glycol and after adding thereto 50 ppm of spherical silica particles having a mean particle size of 0.3 $\mu$m, polyethylene-2,6-naphthalate was by an ester exchange method according to an ordinary method. The IV was 0.56 (measured in phenol/tetrachloroethane=6/4 (by weight ratio)).

After drying the pellets thereof at 170° C. for 4 hours, the pellets were melted at 300° C. and thereafter extruded from a T-type die followed by quenched to provide an unstretched film having a thickness which became 100 $\mu$m after thermal fixing.

The film was longitudinally stretched to 3.0 times, then wide-direction stretching to 3.3 time was practiced. The temperatures in the cases were 140° C. and 130° C. respectively. Thereafter, after thermally fixing at 250° C. for 20 seconds, the film was mitigated by 3% in the width direction. The film was wound at 4 kg/cm$^2$ as the above-described PET. Thus, the rolled film having a width of 1.5 meters and a thickness of 100 $\mu$m was obtained. The Tg of the PEN thus obtained was 119° C.

(1-3) Syndiotactic Polystyrene (SPS) Support:

By following the same procedure as Example 1 of JP-A-8-201968, a biaxially stretched film having a thickness of 100 $\mu$m and a width of 1.5 meters was obtained. The Tg of the SPS thus obtained was 100° C.

(2) Preparation of Coated Layer

On each of the supports described above was formed a coated layer selected from the following materials as shown in Table 1 below.

(2-1) SBR Coated Layer:

i) Corona Discharging

Prior to coating, corona discharging (using a solid state corona discharging machine, Model 6KVA, manufactured by Piller co., both surfaces of a support were treated under room temperature at 20 meters/minute) was applied to the surfaces of the support to be coated. From the read values of the electric current and the voltage in this case, it was confirmed that the treatment of 0.375 kV•A•minute/m$^2$ was applied to the support. In this case, the treating frequency was 9.6 kHz and the gap clearance between the electrode and the dielectric roll was 1.6 mm. Then, the following layer was coated thereon.

ii) Coating

A water-dispersed latex having the following composition was coated on the support using a wire bar at a dry thickness shown in Table 1 above and dried at 120° C. for 2 minutes.

| | |
|---|---|
| Butadiene-styrene copolymer latex (solid component 43%, butadiene/styrene = 32/68 by eight ratio) | 13 ml |
| 2,4-Dichloro-6-hydroxy-s-triazine sodium salt 8% aqueous solution | 7 ml |
| Sodium laurylbenzenesulfonate 1% aq. soln. | 1.6 ml |
| Distilled water | 80 ml |

(2-2) Gelatin 1 Coated Layer:

An aqueous solution having the following composition was coated using a wire bar at a dry thickness shown in Table 1 above and dried at 185° C. for 5 minutes.

| | |
|---|---|
| Gelatin | 0.9 g |
| Methyl cellulose (Metolose SM15, substitution degree 1.79 to 1.89) | 0.1 g |
| Acetic acid (concentration 99%) | 0.02 ml |
| Distilled water | 99 ml |

(2-3) PVdC Coated Layer:

After adjusting the pH of the following water-dispersed latex using 10% KOH, the latex was directly coated on a support without applying a surface treatment thereto by a bar coating method such that the layer thickness after drying became the value shown in Table 1 below and dried at 120° C. for 2 minutes.

| | |
|---|---|
| Vinylidene chloride series latex solution | 15 wt. % |
| 2,4-Dichloro-6-hydroxy-s-triazine sodium salt | 0.15 wt. % |
| Silica fine particles (mean particle size 0.1 $\mu$m) | 0.2 wt. % |
| Distilled water to make | 100 wt. % |

The vinylidene chloride series polymer used in the case was a copolymer obtained by copolymerizing vinylidene chloride (VdC), methyl methacrylate (MMA), methacrylic acid (Ma), and acrylonitrile (AN) and was prepared as the form of a latex liquid. The composition of PVsC was shown in Table 1 above. When the composition of VdC was defined as X wt %, MMA, Ma, and AN were prepared such that the compositions of them became the values (wt. %) obtained by multiplying (100–X) wt % by 0.8, 0.05, and 0.1 respectively. They can be prepared by referring to the Synthesis Example 1 of JP-A-3-141346. The solid component concentration of the latex solution obtained was 50% and the mean particle size thereof was 0.16 $\mu$m.

(2-2) Gelatin 2 Coated Layer:

An aqueous solution having the following composition was coated such that the layer thickness after drying became the values of Table 1 and dried at 180° C. for 5 minutes.

| | |
|---|---|
| Gelatin | 1.0 wt. % |
| $C_{12}H_{25}O(CH_2CH_2O)_{10}H$ | 0.05 wt. % |
| Methyl cellulose | 0.05 wt. % |
| Distilled water to make | 100 wt. % |

(2-3) Gelatin 3 Coated Layer:

After coating a liquid of the following composition, the coated layer was dried at 40° C. for 5 minutes.

| | | |
|---|---|---|
| $SnO_2$/Sb (9/1 by weight ratio, mean particle size 0.25 μm) (composite metal oxide) | 200 | $mg/m^2$ |
| Gelatin ($Ca^{2+}$ content 3000 ppm) | 77 | " |
| Sodium dodecylbenzenesulfonate | 10 | " |
| Dihexyl-α-sulfosuccinate sodium | 10 | " |
| Sodium polysutyenesulfonate | 9 | " |

(2-4) Polyolefin Coated Layer:

A polyolefin latex water-dispersed liquid of the following composition was coated such that the dry thickness became the value shown in Table 1 and dried at 170° C. for 30 seconds.

| | |
|---|---|
| Polyolefin (Chemipal S-120, 27 wt. %, made by Mitsui Petrochemical Industries, Ltd.) | 3.0 wt. parts |
| Colloidal silica (Snow Tex C, made by Nissan Chemical Industries, Ltd.) | 2.0 wt. parts |
| Epoxy compound (Denacol EX-614B, made by Nagase Kasei K.K.) | 0.3 wt. parts |
| Distilled water to make | 100 wt. parts |

(2-5) Acrylic Coated Layer:

An acrylic latex water-dispersed liquid of the following composition was coated such that the layer thickness after drying became the value shown in Table 1 and dried at 180° C. for 30 seconds to prepare a support having a surface electric resistance of $10^6$ Ω.

| | |
|---|---|
| Acrylic resin aqueous dispersion (Jurymer ET410, solid component 20 wt. %, made by Nihon Junyaku K.K.) | 2.0 wt. parts |
| Tin oxide-antimony oxide aqueous dispersion (mean particle size 0.2 μm, 17 wt. %) | 18.1 wt. parts |
| Polyoxyethylene phenyl ether | 0.1 wt. part |
| Distilled water to make | 100 wt. parts |

(2-6) Diacetyl Cellulose (DAC) Coated Layer:

i) Glow Discharging Treatment

The following glow discharging treatment was applied to the coating surface of a support.

Four rod-form electrodes each having a diameter of 2 cm and a length of 120 cm were fixed on an insulating plate with an interval of 10 cm. The electrode plate was fixed in a vacuum tank and a support was travelled facing the electrode surface with a distance of 15 cm from the electrode surface such that the surface treatment of 2 seconds was performed.

The pressure in the vacuum tank was 0.2 Torr and the $H_2O$ partial pressure in the atmospheric gas was 75% at the surface treatment.

The glow discharging treatment was carried out at a discharging frequency of 30 KHz and by the treatment strength of each level under the condition shown in Table 1. The vacuum glow discharging electrodes were as described in JP-A-7-3056. Before winding the support after the discharging treatment, the support was brought into contact with a cooling roll such that the surface temperature became 30° C. and thereafter was wound.

ii) Coating

An organic solvent series coating liquid of the following formula was coated such that the thickness after drying became the dry thickness shown in Table 1 and dried at 120° C.

| | |
|---|---|
| Diacetyl cellulose | 100 wt. parts |
| Trimethylpropane-3-toluene diisocynate | 25 wt. parts |
| Methyl ethyl ketone | 1050 wt. parts |
| Cyclohexane | 1050 wt. parts |

(3) Heat Treatment

A heat treatment was practiced under the condition shown in Table 1. In this case, however, as each of the dense rolls used, an aluminum-made roll having a diameter of 10 cm and a surface roughness of 0.01 μm applied thereon hard chromium plating was used.

(4) Cooling

After the heat treatment, the points becoming Tg +40° C. and Tg −10° C. were determined by a non-contact thermometer and from the distance between the points and the travelling speed, the cooling rate was calculated and shown in Table 1. After thus cooling, the support was wound round a roll.

(5) Evaluation (5-1) Surface Stain (haze)

As a method of most sensitively detecting the surface stains after the heat treatment, a haze measurement was practiced. That is, the value obtained by subtracting the values of the hazes on both surfaces of a film before the heat treatment from the hazes of both surfaces of the film after the heat treatment is shown in Table 1.

(5-2) Longitudinal Wrinkles

The film having a width of 1.5 meters and a length of 25 meters after the heat treatment was hung perpendicularly and the number of the unevenness with the pitches of from 10 to 30 cm formed was visually counted and shown in Table 1.

(5-3) Streaking

The film after the heat treatment was cut to a width of 1.5 meters and a length of 2 meters, placed on a flat stand disposed horizontally, and the number of streaks with pitches of from 1 to 3 cm formed was visually counted and shown in Table 1.

(5-4) Unevenness Along Width Direction

The film after the heat treatment was measured by the above-described method and the heights are shown in Table 1.

(5-5) Thermal Dimensional Change

The film after the heat treatment was measured by the above-described method and the values are shown in Table 1.

TABLE 1

| | | Coated Layer | | | | | | | Heat Treatment | | | | |
|---|---|---|---|---|---|---|---|---|---|---|---|---|---|
| | | Side A | | | Side B | | | Total | Dense Rolls | | | | |
| | Support[1] | Thickness (μm) | Material[2] | Coating Liquid[3] | Thickness (μm) | Material[2] | Coating Liquid[3] | Thickness (μm) | Gap (cm) | Number of Rolls | Tension ($kg/cm^2$) | Temperature (° C.) | Time (sec) |
| Sample 1 | PT | 0.04 | Acryl | LTX | 0.3 | SBR | LTX | 0.47 | 3.5 | 4 | 2.0 | 145 | 45 |
| | | 0.03 | Polyolefin | LTX | 0.1 | Gelatin 1 | AQ | | | | | | |
| Sample 2 | PT | 0.15 | Gelatin 3 | AQ | 0.5 | PVdC | LTX | 0.85 | 3.5 | 4 | 2.0 | 145 | 45 |
| | | | | AQ | 0.2 | Gelatin 2 | AQ | | | | | | |
| Sample 3 | PT | 0.5 | SBR | LTX | 0.7 | SBR | LTX | 2.0 | 3.5 | 4 | 2.0 | 145 | 45 |
| | | 0.3 | Gelatin 1 | AQ | 0.5 | Gelatin 1 | AQ | | | | | | |
| Sample 4 | PT | 18 | DAC | OS | — | — | — | 18 | 3.5 | 4 | 2.0 | 145 | 45 |
| Sample 5 | PT | Same as Sample 1 | | | Same as Sample 1 | | | 0.47 | 3.5 | 4 | 8.0 | 130 | 1500 |
| Sample 6 | PT | Same as Sample 1 | | | Same as Sample 1 | | | 0.47 | 3.5 | 4 | 0.3 | 215 | 0.15 |
| Sample 7 | PT | Same as Sample 1 | | | Same as Sample 1 | | | 0.47 | 3.5 | 4 | 2.0 | 145 | 45 |
| Sample 8 | PT | Same as Sample 1 | | | Same as Sample 1 | | | 0.47 | 48 | 2 | 2.0 | 145 | 15 |
| Sample 9 | PT | Same as Sample 1 | | | Same as Sample 1 | | | 0.47 | 20 | 15 | 2.0 | 145 | 15 |
| Sample 10 | PT | Same as Sample 1 | | | Same as Sample 1 | | | 0.47 | 0.5 | 75 | 2.0 | 145 | 15 |
| Sample 11 | PN | Same as Sample 1 | | | Same as Sample 1 | | | 0.47 | 3.5 | 4 | 2.0 | 145 | 15 |
| Sample 12 | SP | Same as Sample 1 | | | Same as Sample 1 | | | 0.47 | 3.5 | 4 | 2.0 | 145 | 15 |
| Comp. Sample 1 | PT | Same as Sample 1 | | | Same as Sample 1 | | | 0.47 | — | 0 | 2.0 | 145 | 45 |
| Comp. Sample 2 | PT | Same as Sample 1 | | | Same as Sample 1 | | | 0.47 | 55 | 2 | 2.0 | 145 | 45 |
| Comp. Sample 3 | PT | Not coated | | | Not coated | | | 0 | 3.5 | 4 | 2.0 | 145 | 45 |
| Comp. Sample 4 | PT | Same as Sample 1 | | | Same as Sample 1 | | | 0.47 | 3.5 | 4 | 2.0 | 145 | 45 |

| | | Surface State | | | | Thermal |
|---|---|---|---|---|---|---|
| | Cooling Rate (° C./sec) | Surface Stain Haze Increase A/B sides (%) | Longitudinal Wrinkles (number) | Streaking (number) | Thickness Unevenness (μm) | Dimensional Changing Ratio (MD/TD (%)) |
| Sample 1 | 0.6 | 0.3/0.1 | 0 | 0 | 20 | −0.01/0.02 |
| Sample 2 | 0.6 | 0.0/0.0 | 0 | 0 | 25 | −0.01/0.01 |
| Sample 3 | 0.6 | 0.2/0.1 | 0 | 0 | 30 | −0.01/0.02 |
| Sample 4 | 0.6 | 2.5/5.8 | 0 | 0 | 25 | −0.01/0.03 |
| Sample 5 | 0.6 | 0.5/0.3 | 1 | 0 | 150 | −0.04/0.04 |
| Sample 6 | 0.6 | 0.6/0.4 | 1 | 0 | 120 | −0.02/0.02 |
| Sample 7 | 8.5 | 0.3/0.1 | 0 | 3 | 180 | −0.04/0.04 |
| Sample 8 | 0.6 | 0.3/0.2 | 0 | 0 | 160 | −0.01/0.01 |
| Sample 9 | 0.6 | 0.3/0.2 | 0 | 0 | 15 | −0.03/0.04 |
| Sample 10 | 0.6 | 0.3/0.3 | 0 | 0 | 5 | −0.03/0.04 |
| Sample 11 | 0.6 | 0.2/0.2 | 0 | 0 | 55 | −0.01/0.02 |
| Sample 12 | 0.6 | 0.2/0.1 | 0 | 0 | 80 | −0.05/0.05 |
| Comp. Sample 1 | 0.6 | 0.2/0.2 | 8 | 0 | 380 | −0.03/0.02 |
| Comp. Sample 2 | 0.6 | 0.2/0.2 | 4 | 0 | 240 | −0.03/0.02 |
| Comp. Sample 3 | 0.6 | 5.6/5.8 | 0 | 0 | 180 | −0.03/0.02 |
| Comp. Sample 4 | 12.0 | 0.3/0.2 | 0 | 15 | 280 | −0.06/0.05 |

[1]Support: PT = PET PN = PEN SP = SPS
[2]Material: Upper row = Layer near support Lower row = Layer laminated thereon
[3]Coated liquid: LTX = Latex aqueous solution AQ = Aqueous solution OS = Organic solvent solution According to the present invention, a photographic film having less surface stains after heat treatment and a good planar property and the heat treatment method thereof can be provided.

While the invention has been described in detail and with reference to specific examples thereof, it will be apparent to one skilled in the art that various changes and modifications can be made therein without departing from the spirit and scope thereof.

What is claimed is:

1. A method for heat-treating a support for a photographic film while conveying, which comprises the steps of:

passing said support through from 2 to 100 rolls disposed so that gaps between the adjacent rolls are within the range of from 0.1 cm to 50 cm; and heat-treating said support during the conveyance, winding said heat-treated support, wherein said heat-treated support is cooled before said winding, the cooling rate in the temperature range from the glass transition temperature (Tg) of said support +40° C. to the Tg −10° C. being at 0.01° C./second to 10° C./second, wherein said support has coated thereon from 1 to 20 layers, and wherein said support is conveyed at a tension of from 1 $kg/cm^2$ to 10 $kg/cm^2$.

2. The heat-treatment method of claim 1, wherein the total thickness of the layer(s) coated on said support is from 0.1 μm to 20 μm.

3. The heat-treatment method of claim 1, wherein the layer(s) coated on said support are formed from aqueous solution(s).

4. The heat-treatment method of claim 1, wherein said heat-treatment is carried out at from 100° C. to 220° C. for from 0.1 second to 30 minutes.

5. The heat-treatment method of claim 1, wherein said support comprises a polyester.

6. The heat-treatment method of claim 1, wherein said coating layer is composed of gelatin, casein, agar, sodium alginate, starch, polyvinyl alcohol, a polyacrylic acid copolymer, gum arabic; a copolymer of maleic anhydride with carboxymethyl cellulose or hydroxymethyl cellulose; a water-soluble polyester, carboxymethyl cellulose, hydroxyethyl cellulose, a vinyl polymer; a vinyl copolymer having a monomer selected from the group consisting of vinyl chloride, vinylidene chloride, butadiene, vinyl acetate, styrene, acrylonitrile, a methacrylic acid ester, methacrylic acid, acrylic acid, itaconic acid, maleic anhydride and an acrylic acid ester; water dispersion latex polymers; solutions of cellulose series polymers selected from the group consisting of diacetyl cellulose, nitrocellulose, triacetyl cellulose, and hydroxypropyl cellulose; (meth)acrylic acid ester polymers, olefin series polymers, styrene series polymers, vinylidene chloride, rubber series polymers, polycarbonate, or polyarylate.

7. The heat-treatment method of claim 6, wherein said water dispersion latex polymers are selected from the group consisting of polyurethane and polyolefin.

8. The heat-treatment method of claim 7, wherein said water dispersion latex polymers have an average particle size of the polymer latex of from 20 nm to 200 nm.

9. The heat-treatment method of claim 6, wherein said (meth)acrylic acid ester polymers are selected from the group consisting of polymethyl methacrylate and ethyl acrylate.

10. The heat-treatment method of claim 6, wherein said olefin series polymer is polyethylene.

11. The heat-treatment method of claim 1, wherein the support layer is composed of polyester, polycarbonate, polystyrene, or polyarylate.

12. A method for heat-treating a support for a photographic film while conveying, which comprises the steps of:

passing said support through from 2 to 100 rolls disposed so that gaps between the adjacent rolls are within the range of from 0.1 cm to 50 cm; and heat-treating said support during the conveyance, wherein said support has coated thereon from 1 to 20 layers, and which further comprises winding said heat-treated support, wherein said heat-treated support is cooled before said winding, the cooling rate in the temperature range from the glass transition temperature (Tg) of said support +40° C. to the Tg −10° C. being at 0.01° C./second to 10° C./second.

* * * * *